W. B. WOLFF.
MEAT SLICING MACHINE.
APPLICATION FILED MAR. 4, 1915.
1,186,258.
Patented June 6, 1916.
5 SHEETS—SHEET 1.
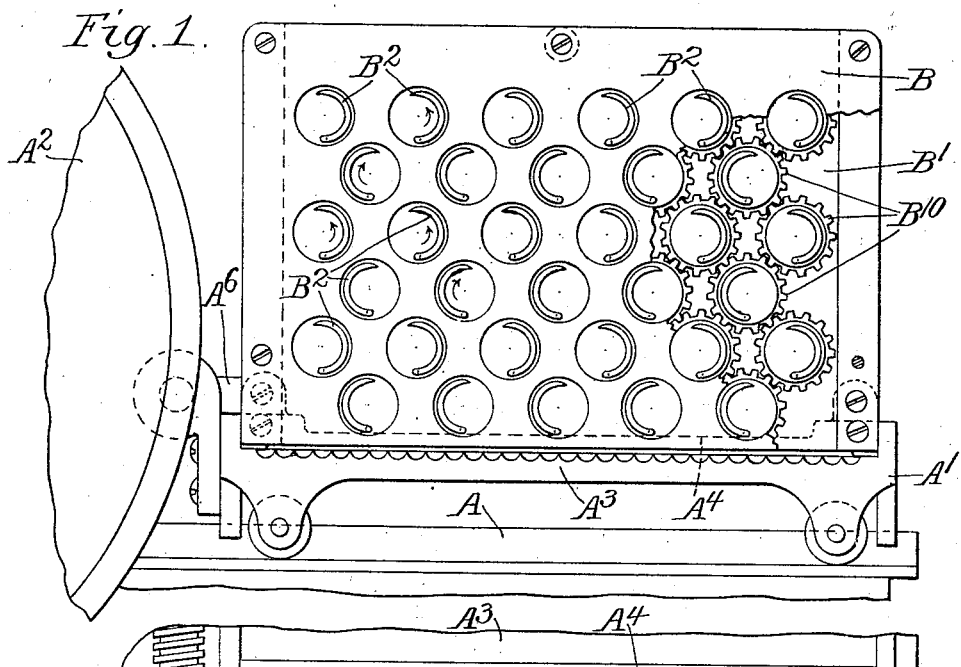
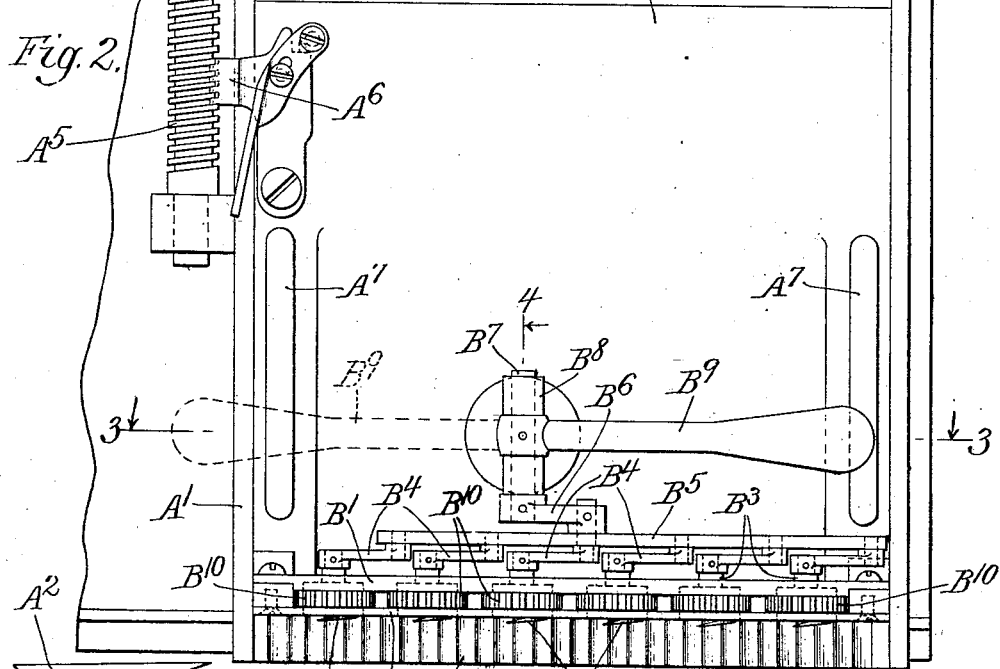
Witnesses.
Edward T. Wray.
Minnie M. Lindeman
Inventor.
Wallace B. Wolff.
by Parker Carter
Attorneys.

W. B. WOLFF.
MEAT SLICING MACHINE.
APPLICATION FILED MAR. 4, 1915.

1,186,258.

Patented June 6, 1916.
5 SHEETS—SHEET 2.

Witnesses.
Edward T. Wray.
Minnie M. Lindeman

Inventor.
Wallace B. Wolff.
by Parker & Carter
Attorneys.

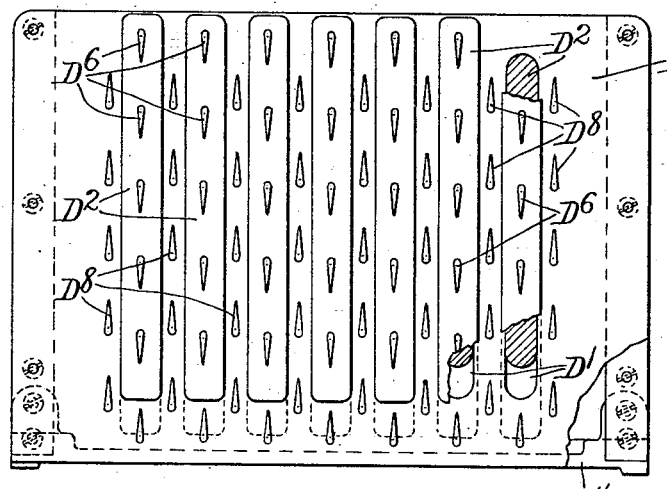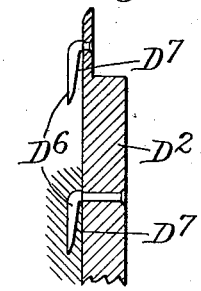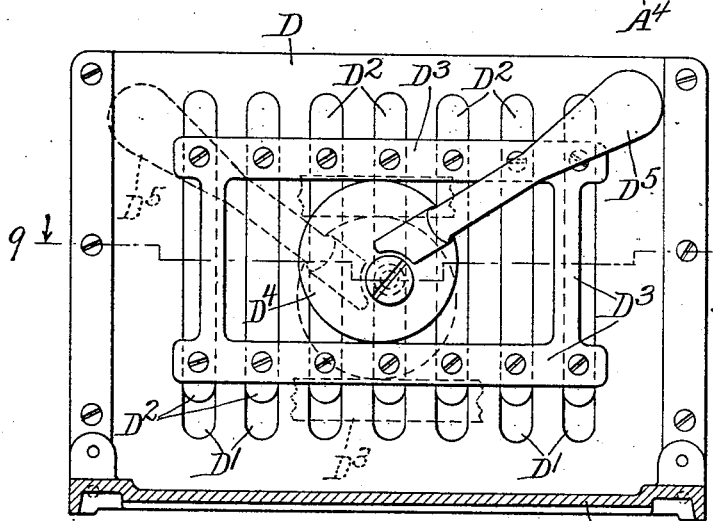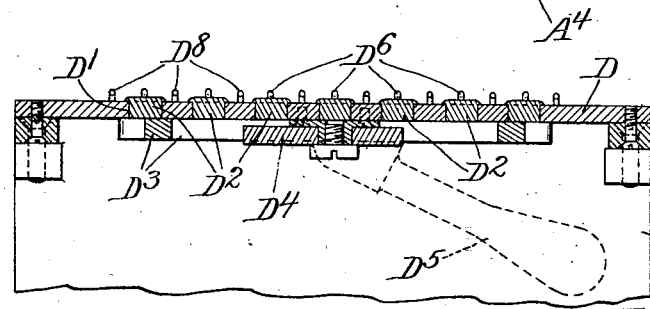

W. B. WOLFF.
MEAT SLICING MACHINE.
APPLICATION FILED MAR. 4, 1915.
1,186,258. Patented June 6, 1916.
5 SHEETS—SHEET 4.
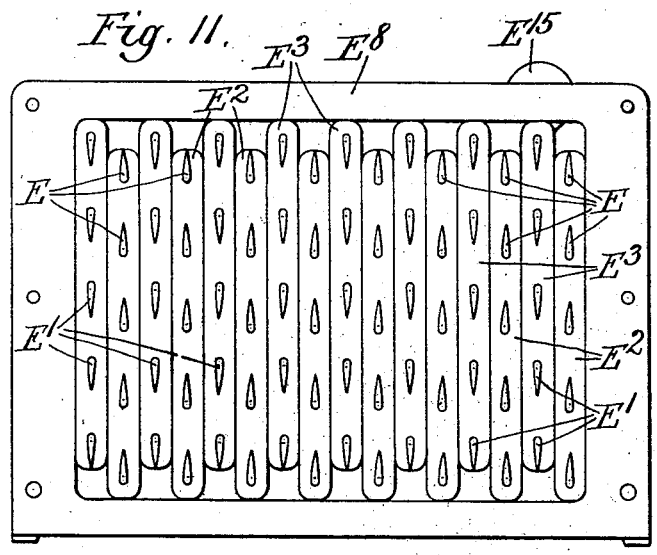
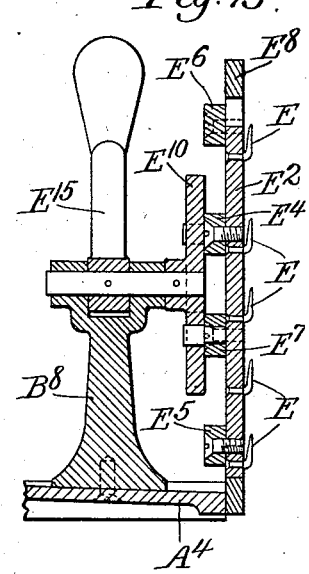
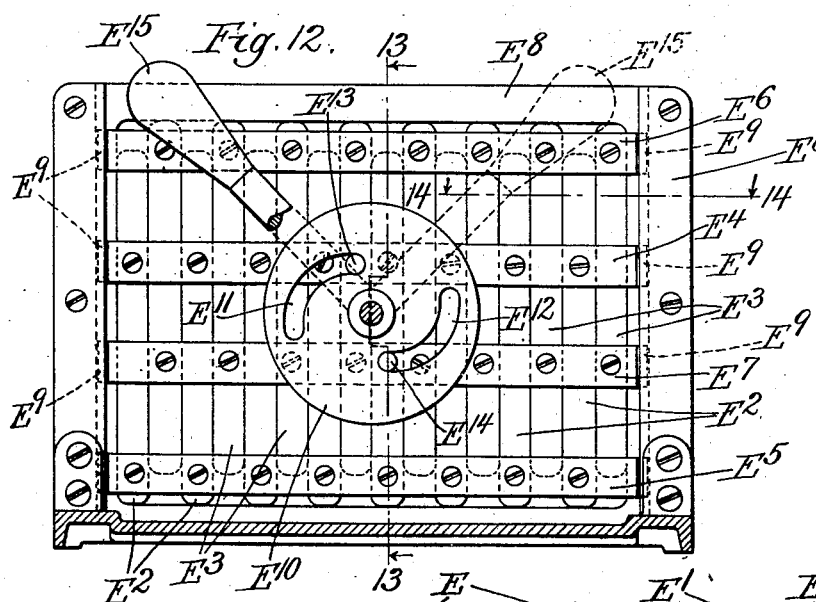
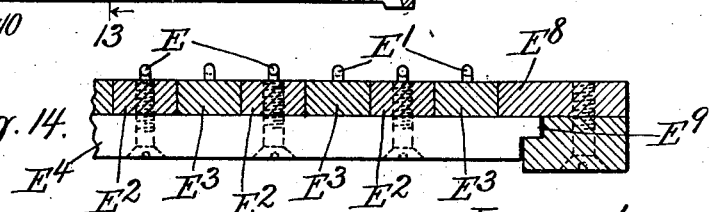
Witnesses.
Edward T. Wray.
Minnie M. Lindman
Inventor.
Wallace B. Wolff.
by Parker & Carter
Attorneys.

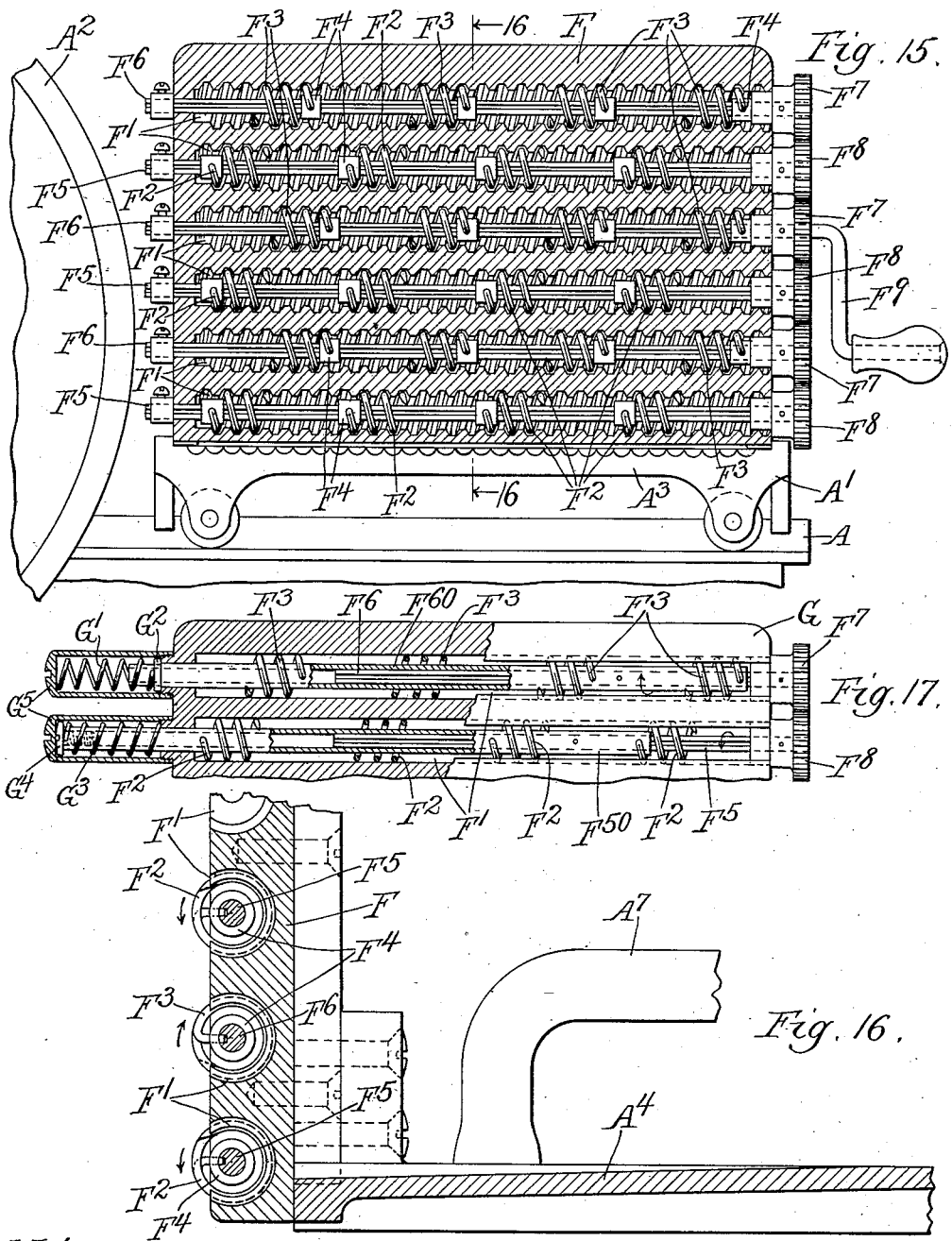

UNITED STATES PATENT OFFICE.

WALLACE B. WOLFF, OF CHICAGO, ILLINOIS, ASSIGNOR TO AMERICAN SLICING MACHINE COMPANY, OF CHICAGO, ILLINOIS, A CORPORATION OF ILLINOIS.

MEAT-SLICING MACHINE.

1,186,258.

Specification of Letters Patent.

Patented June 6, 1916.

Application filed March 4, 1915. Serial No. 11.957

*To all whom it may concern:*

Be it known that I, WALLACE B. WOLFF, a citizen of the United States, residing at Chicago, in the county of Cook and State of Illinois, have invented a certain new and useful Improvement in Meat-Slicing Machines, of which the following is a specification.

My invention relates particularly to means for fastening or holding meat which is to be sliced in position on the slicing machine and it has for one object to provide means for holding the end of the piece so that the end may be sliced down to the last slice without danger or loss.

It has for another object to provide means for engaging a flat meat surface and drawing it up and holding it against a meat plate or face plate so that it may be cut with a minimum of waste.

Other objects of my invention will appear in the specification.

My invention is more or less diagrammatically illustrated in the accompanying drawings, wherein—

Figure 3:
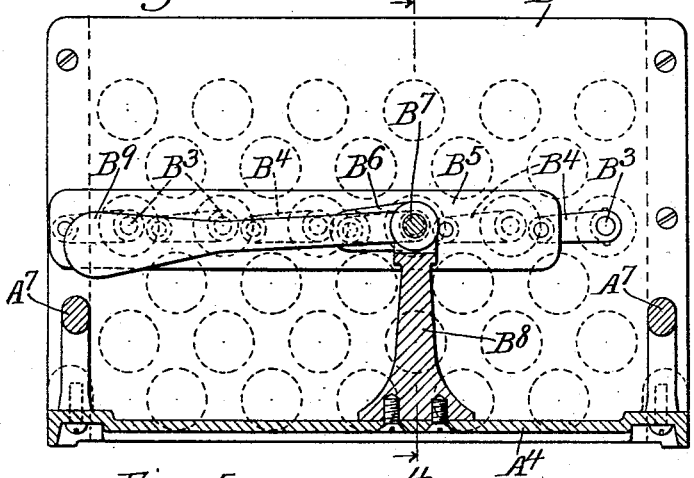
Figure 4:
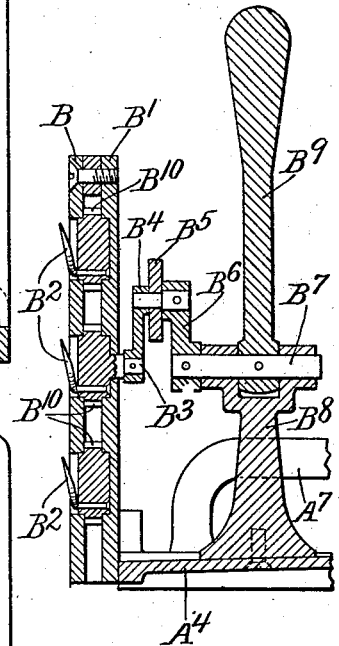
Figure 5:
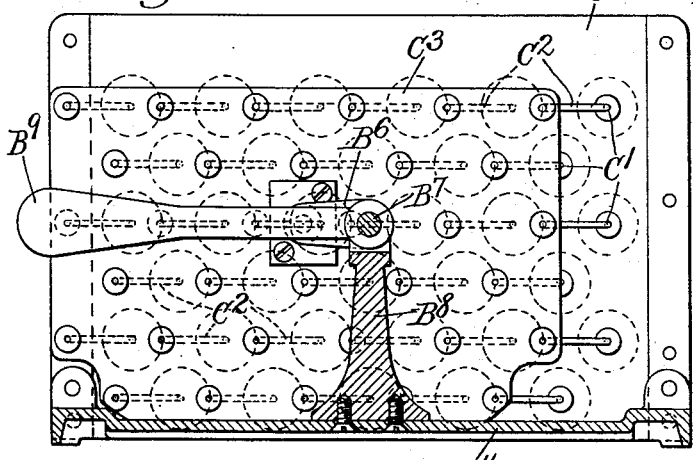
Figure 6:
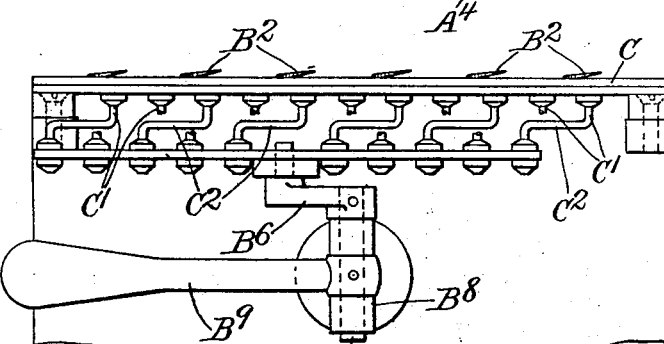

Figure 1 is a detail side elevation of a slicing machine showing my invention attached with parts broken away; Fig. 2 is a detail plan view of a portion of the slicing machine; Fig. 3 is a section along the line 3—3 of Fig. 2; Fig. 4 is a section along the line 4—4 of Figs. 2 and 3; Fig. 5 is a section along the same line as Fig. 3 of a modified form; Fig. 6 is a detail plan view of a modified form; Fig. 7 is a front elevation of the face plate showing a further modification; Fig. 8 is a back view of the same plate; Fig. 9 is a section on the line 9—9 of Fig. 8; Fig. 10 is a detail section through the meat holding hooks; Fig. 11 is a front elevation of a still more modified form of which Fig. 12 is the rear elevation; Fig. 13 is a section on the line 13—13 of Fig. 12; Fig. 14 is a section on the line 14—14 of Fig. 12; Fig. 15 is a front elevation of a modified form; showing the face plate in section. Fig. 16 is a section along the line 16—16 of Fig. 15. Fig. 17 is a front elevation of the upper portion of a face plate, with parts in section, of a further modified form.

Like parts are indicated by like letters throughout the several figures.

A is a track along which the meat carriage $A^1$ is free to move being propelled by any suitable means not here shown to reciprocate it toward and from the cutting knife $A^2$. Mounted on the meat carriage is a fixed meat plate $A^3$ corrugated to guide the meat in the usual manner. Slidably mounted on the carriage above this meat plate is a feed plate $A^4$ adapted to be driven by a feed screw $A^5$ engaging a nut $A^6$ on the plate. Handles $A^7$ are provided whereby the feed plate may be manipulated.

Projecting upwardly in each case from the forward edge of the feed plate is a face plate B and it is to this face plate that the meat is attached when it is to be cut, that is to say, when the ordinary type of meat clamping plate is no longer available owing to the meat having been cut too near the heel.

I shall now describe a large number of different forms or modifications of means for holding, drawing and clamping the meat into position upon the face plate. It will be understood that the purpose of each movement is the same, viz: to grip the meat and permit the slicing knife to cut down to the last slice.

In Figs. 1 to 4 is shown one form of meat holding and clamping means. The face plate is apertured as indicated and behind it is located a back plate $B^1$ whose surface is recessed in register with the apertures in the face plate B. Located between the face plate B and the back plate $B^1$ and mounted for rotation are a series of gears $B^{10}$ in mesh with one another and as shown in Fig. 1 located partially within the recesses in the back plate $B^1$ and partially within the apertures in the plate B. Projecting from each of these gears and extending outwardly through the apertures in the face plate are a series of spiral cork screw like hooks $B^2$, which hooks project in front of and are always located in front of the effective surface of the face plate. These gears are located in a series of horizontal tiers as indicated and since they are in mesh each with the other it is evident that the gears in one tier rotate in the opposite direction from the gears in the adjacent tier and so the spiral hooks in one tier point in the opposite direction from the spiral hooks in the other tier. Each gear in one of the rows or tiers is provided as indicated with a rearwardly extending stub shaft $B^3$ on which is mounted a crank $B^4$. Each of these cranks is pivoted on a master plate $B^5$ and this master plate is pivoted on and suspended and driven by a crank $B^6$ which crank is rigidly mounted on the shaft $B^7$ on the bracket $B^8$ and adapted to be rotated by means of the handle $B^9$ in such wise that a rotation of the handle to an angle of 180° causes each of the gears to rotate through a similar angle and thus causes each of the cork screw like meat holding hooks to rotate through a similar angle and since these hooks are spiral if when they rotate a meat slice or meat piece is pressed against them it is obvious that they will enter it and draw it down against the face plate.

In Figs. 5 and 6 is illustrated a modified form of driving mechanism for the spiral hooks. It will be noted in this case that a face plate C has a series of spiral cork screw-like hooks projecting outwardly from its front. These are all arranged for rotation in the same direction and are mounted on shafts $C^1$ provided with crank arms $C^2$ in pivotal engagement with a plate $C^3$. This plate is pivoted on a similar crank arm $B^6$ and adapted to be controlled by a similar lever $B^9$. It is obvious that in this case as in the case of Figs. 1 to 4 when the lever $B^9$ is rotated the plate travels with it and causes each of the cranks attached to it to rotate through a similar angle of 180° and thus rotate the cork screw like members, the difference being that in the latter case the cork screw like members all rotate in the same direction whereas in the former case some rotate in a counterclockwise direction.

In Figs. 7 to 9 inclusive is shown a modified form. D is a face plate having a series of slots $D^1$ therein. In each of these slots is mounted a sliding pin bar $D^2$. These pin bars are all of them attached to a driving and supporting frame $D^3$ which frame is in engagement both above and below with a circular cam $D^4$ mounted for rotation on the back of the plate D and adapted to be operated by a lever $D^5$ in such wise that a rotation of the lever through any suitable angle as indicated will cause the pin bars to move from one end of the slot to the other. These pin bars are provided with a series of pins or hooks $D^6$ such as indicated in Fig. 10 all pointing downwardly and having a wedge like inner surface as at $D^7$. The face plate itself is provided with a series of similar hooks $D^8$ all pointing upwardly. The parts in full lines are in the open position when the lever is moved to the position shown in dotted lines it will draw the pin bars down so that any meat which has been presented to the hooks will be penetrated then drawn by the wedging surface into position firmly against the face plate.

In Figs. 11 to 14 inclusive is shown a modification wherein the same form of wedge shape straight hooks is used up. These hooks as indicated at E, $E^1$ are mounted each upon a pin strip $E^2$, $E^3$ respectively and these pin strips $E^2$, $E^3$ are all free to move, the strips $E^2$ up and the strips $E^3$ down. The strips $E^2$ are each of them rigidly attached to the cross bars $E^4$, $E^5$ and the strips $E^3$ to the cross bars $E^6$, $E^7$. These cross bars are mounted for sliding movement in the frame $E^8$ which here takes the form of the face plate the ends of the cross bars being held in a dove-tail connection as indicated at $E^9$. $E^{10}$ is a cam disk having cam slots $E^{11}$, $E^{12}$ therein. These cam slots are in engagement with pins $E^{13}$, $E^{14}$ rigid on the strips $E^4$, $E^7$ respectively so that a rotation of the cam disk by means of a lever $E^{15}$ will result in the desired movement of the pin strips. In the full line position the parts are as shown in the open position when moved to the dotted line the strips $E^2$ are brought up and the strips $E^3$ down to cause the pins to enter and clamp the meat by drawing it against the face plate.

In the modified form shown in Figs. 15 and 16, a thicker and more rigid and heavier face plate F is used. This face plate has in its effective surface a series of horizontally disposed cylindrical slots $F^1$ which slots are screw-threaded as indicated and so disposed with respect to the surface of the plate that the spiral movable needles or hooks $F^2$, $F^3$ which engage the screw threads project partially above the surface of the plate but are held in position in the slots and cannot be withdrawn laterally. These hooks or needles have sharp points as indicated at one end and are mounted at the other end upon driving collars $F^4$ which collars are slidable along shafts $F^5$, $F^6$ being feathered thereupon. These shafts are mounted for rotation within the face plate being located one in each slot and being provided each at one end with the gears $F^7$, $F^8$ in mesh one with another so that all of these shafts must rotate in unison, the adjacent shafts rotating in opposite directions. $F^9$ is a crank handle provided for the purpose of rotating one of these gears and thus causing the rotation of all. It will be noted that when this rotation takes place the needles $F^3$ move in one direction while the needles $F^2$ move in another direction. As they are shown in Figs. 15 and 16 each needle is $2\frac{1}{2}$ revolutions long, that is to say, for each needle to move its entire length it must move $2\frac{1}{2}$ revolutions and when a cut of meat is placed against this face plate the crank is turned $2\frac{1}{2}$ revolutions, it will be found that each needle has threaded itself through the meat so as to bring the tail of the needle where it engages the driving sleeve firmly against the meat, that is to say, each can enter the meat no farther and the result is that the meat is firmly threaded to the face plate by $2\frac{1}{2}$ coils of each needle and since these needles move in opposite directions it is evident that the balance is at all times preserved and that the meat is held on the face plate in a sufficient number of places to insure against the danger of displacement or unintentional withdrawal of the meat.

In the modified form shown in Fig. 17, the slots in the face plate are not screw-threaded. The face plate G contains, however, the slots $F^1$ horizontally disposed enlarged below the surface as in the previous case. The needles $F^3$, however, instead of being spaced and held in position by the screw threads in which they are turned, are mounted on the sleeves $F^{50}$, $F^{60}$. These sleeves are free to slide along the shafts $F^5$, $F^6$, the sleeve $F^{60}$ being thrust to the right, the sleeve $F^{50}$ to the left by springs $G^1$, $G^3$ as indicated, contained within the housing $G^5$ and pressing respectively against the housing $G^5$ and a collar $G^2$ on the sleeve $F^{60}$, and a part of the face plate G and a cap screw $G^4$ on the sleeve $F^{50}$. The operation of course is obvious. When the crank is rotated the sleeves and shafts rotate in opposite directions. The needles or holding screws twist into the meat and draw the sleeve toward or from the spring as the case may be against the spring tension. The meat is thus sewed to the face plate. When the meat is released by a reverse movement, the springs insure that the needles will be in their proper position at all times.

The use and operation of my invention are as follows:—When meat is being cut it is ordinarily held upon a meat plate which is fed along the meat carriage toward the slicing knife while the meat carriage reciprocates back and forth for cutting. This is all the usual type. The meat is clamped to this meat plate by any suitable clamping means which usually operate to press the meat down upon the plate at a point removed from the cutting zone adjacent the heel or end of the meat piece. It is obvious that after a certain number of slices have been removed nothing further can be done because the clamp is in the way. According to my invention when this situation prevails I remove the ordinary type of meat plate and this clamping mechanism and substitute my improved form which consists in a flat horizontal plate resting upon and free to slide on the plate carriage together with a flat vertical plate projecting upwardly from this horizontal plate. The front of this flat vertical plate, that is to say, the side removed from or opposite to the horizontal plate is equipped with means for engaging the flat surface of the meat when the last slice is removed and drawing this flat surface up against the flat face plate and holding it rigidly there. When these means have been operated and the flat surface left by the final cut has been drawn against and is firmly clamped upon the flat face plate the machine is again thrust into operation and the slicing again commences, this time at the extreme heel of the piece, the slices are cut off until the flat plate reaches its forward limit when the last cut will be made just missing the meat holding means.

It will be noted that my meat holding means of whatever kind projects forwardly from the plate at all times and that when the meat is on the first approach to the plate it is held off it by these holding means but that when these holding means are manipulated they enter or penetrate and draw it down against the plate and clamp it firmly in position.

Referring specifically to the particular types shown, it will be noted that in one form the plate is equipped with a series of cork screw-like hooks and these cork screw-like hooks are all rotated in unison throughout one complete revolution. These cork screw-like hooks are made upon a perfect spiral so that each hook enters the meat and as it rotates continues to enter it along the line which is subsequently followed by the entire body of the spiral cork screws. Thus the cork screw hook penetrates the meat without tearing and may be drawn therefrom without distortion but its effect is to draw the meat down firmly upon the face plate.

In the form wherein are shown a series of hooks operating one toward the other, it will be noted that these hooks form one side substantially parallel with the surface of the plate, the other inclined thereto so that as they are drawn together they tend to wedge clamp or draw the meat downwardly toward the plate, in this case without any more distortion than is absolutely necessary to draw the meat down.

In the third form, it will be noted that the meat is, so to speak, sewn to the plate by a series of spiral needles. The meat in this case is first placed against the plate. The needles are rotated for three or four revolutions and since they are spiral pointed needles the point will pass through the meat two or three times followed by the needle itself so that when, as shown, three or four revolutions have been made, the spiral needle is moved across the plate substantially its own length and is now partially within the meat and partially within the plate so as to bind the meat to the plate. The needle itself has, of course, only the movement across the plate but its position with respect to the plane of the plate is, of course, always the same.

I claim:

1. A meat holder for slicing machines and the like comprising a face plate and means for penetrating the meat, and drawing it toward the plate and clamping it there, said means being movable with respect to the plate only in a plane parallel to the plate.

2. A meat holder for slicing machines and the like comprising a face plate, means carried thereby and located in front thereof for engaging the meat penetrating it and drawing it toward and clamping it upon the plate said means being free to move with respect to the plate only in a plane parallel thereto.

3. A meat holder for slicing machines and the like comprising a supporting surface and a series of spiral rotary meat-engaging hooks and means for rotating them in different directions to engage the meat.

4. A meat holder for slicing machines and the like comprising a support, means for drawing meat toward and clamping it against the support comprising a series of centrally open spiral hooks and means for rotating them to cause them to penetrate the meat and draw it toward the support.

5. A meat holder for slicing machines and the like comprising a support, means for drawing meat toward and clamping it against the support comprising a series of centrally open spiral hooks and means for rotating them to cause them to penetrate the meat and draw it toward the support, said hooks being of such shape that the body of the hook follows the point along the spiral line formed by the point to prevent tearing of the meat.

6. A meat holder for slicing machines and the like, comprising an end plate, a series of cork-screw like spiral meat holding hooks projecting forward from the surface of the plate and means for rotating such hooks to bring them into operative engagements with the meat said hooks being held against longitudinal movement.

7. A meat holder for slicing machines and the like, comprising a recessed face plate and means for drawing the meat toward said plate and forcing it into said recesses.

8. A meat holder for slicing machines and the like, comprising a recessed face plate and means for drawing the meat toward said plate and forcing it into said recess, said means comprising a series of corkscrew like hooks projecting upwardly from the bottom of said recess, and means for rotating them to twist them into the meat.

9. A meat end plate for slicing machines and the like comprising a meat holding surface, a series of spiral rotatively mounted meat holding hooks projecting forwardly therefrom, arranged in parallel separate columns, means for rotating said hooks in unison, and adjacent hooks in opposite directions to engage and hold the meat.

In testimony whereof, I affix my signature in the presence of two witnesses this 25th day of February 1915.

WALLACE B. WOLFF.

Witnesses:
MINNIE M. LINDENAU,
BESSIE S. RICE.